(12) United States Patent
Shagalov

(10) Patent No.: US 9,275,639 B2
(45) Date of Patent: Mar. 1, 2016

(54) CLIENT-SERVER ARCHITECTURE FOR AUTOMATIC SPEECH RECOGNITION APPLICATIONS

(71) Applicant: DIXILANG LTD., Meishar (IL)

(72) Inventor: Victor Shagalov, Rehovot, IL (US)

(73) Assignee: Dixilang Ltd., Maishar (IL)

( * ) Notice: Subject to any disclaimer, the term of this patent is extended or adjusted under 35 U.S.C. 154(b) by 0 days.

(21) Appl. No.: 14/390,304

(22) PCT Filed: Mar. 31, 2013

(86) PCT No.: PCT/IL2013/050292
§ 371 (c)(1),
(2) Date: Oct. 2, 2014

(87) PCT Pub. No.: WO2013/150526
PCT Pub. Date: Oct. 10, 2013

(65) Prior Publication Data
US 2015/0120290 A1 Apr. 30, 2015

Related U.S. Application Data

(60) Provisional application No. 61/618,871, filed on Apr. 2, 2012.

(51) Int. Cl.
G10L 15/08 (2006.01)
G10L 15/30 (2013.01)
G10L 15/065 (2013.01)
G10L 25/78 (2013.01)
G10L 21/0208 (2013.01)

(52) U.S. Cl.
CPC .............. *G10L 15/083* (2013.01); *G10L 15/30* (2013.01); *G10L 15/065* (2013.01); *G10L 21/0208* (2013.01); *G10L 25/78* (2013.01)

(58) Field of Classification Search
CPC ..... G10L 15/30; H04M 3/4936; H04M 3/493; H04M 7/006; Y10S 707/99945
USPC .......... 704/231, 221, 203, 222, 201, E19.001, 704/E15.004, E19.008; 719/328
See application file for complete search history.

(56) References Cited

U.S. PATENT DOCUMENTS 6,092,039 A * 7/2000 Zingher ..................... 704/221
2002/0091515 A1 7/2002 Garudadri
(Continued)

OTHER PUBLICATIONS

International Search Report of PCT/IL2013/050292 dated Jul. 14, 2013.
(Continued)

*Primary Examiner* — Charlotte M Baker
(74) *Attorney, Agent, or Firm* — Venable LLP; Robert Kinberg; Jeffri A. Kaminski

(57) ABSTRACT

A client-server architecture for Automatic Speech Recognition (ASR) applications, includes: (a) a client-side including: a client being part of distributed front end for converting acoustic waves to feature vectors; VAD for separating between speech and non-speech acoustic signals; adaptor for WebSockets; and (b) a server side including: a web layer utilizing HTTP protocols and including a Web Server having a Servlet Container; an intermediate layer for transport based on Message-Oriented Middleware being a message broker; a recognition server and an adaptation server both connected to said intermediate layer; a Speech processing server; a Recognition Server for instantiation of a recognition channel per client; an Adaptation Server for adaptation acoustic and linguistic models for each speaker; a Bidirectional communication channel between a Speech processing server and client side; and a Persistent layer for storing a Language Knowledge Base connected to said Speech processing server.

11 Claims, 7 Drawing Sheets

(56) References Cited

U.S. PATENT DOCUMENTS

2007/0192094 A1    8/2007  Garudadri
2012/0130709 A1*  5/2012  Bocchieri et al. ............. 704/201

OTHER PUBLICATIONS

International Preliminary Report on Patentability dated Jul. 27, 2014.

* cited by examiner

CLIENT-SERVER ARCHITECTURE FOR AUTOMATIC SPEECH RECOGNITION APPLICATIONS

FIELD OF THE INVENTION

The present invention relates to the field of automatic speech recognition. More particularly, the invention relates to a method for providing a generic platform of Automatic Speech Recognition (ASR) applications, running on a data network, such as the Internet.

BACKGROUND OF THE INVENTION

Speech recognition applications are widely used in many enterprises, in order to extract transcriptions of speech. These applications may be for example, dictation, voice requests, indexing audio data (the ability to identify speakers involved in a conversation), voice to text alignment (i.e., time alignment between speech signals and their corresponding text), key word spotting (the identification of keywords in utterances), etcASR systems typically consist of the following components: A Frontend (FE), which is responsible for feature extraction from audio stream and includes a set of algorithms for Digital Signal Processing (DSP), Voice Activity Detection (VAD) and noise reduction.

A Language Knowledge Base (LKB) that typically consists of a language model (LM), an acoustic model (AM) and a dictionary.

A Decoder that receives feature vectors from the FE and seeks the best path in a search space constructed from LKB.

Nowadays, there is no standard for the organization of client-server architecture for (ASR) applications. There is a specification for Session Initiation Protocol (SIP—is a signaling protocol for controlling communication sessions such as voice and video calls over IP) Interactive Voice Response (IVR—a technology that allows a computer to interact with humans through the use of voice and DTMF tones input via keypad). However, this specification is dedicated to the field telephony and is not adapted to the operating conditions of advanced IP-based ASR systems.

It is therefore an object of the present invention to provide a client-server platform for a variety of automatic speech recognition (ASR) applications that are working in the Internet or Intranet data networks.

It is another object of the present invention to provide a client-server platform for a variety of automatic speech recognition (ASR) applications that has a minimal time response for a given environment.

It is another object of the present invention to provide a client-server platform for a variety of automatic speech recognition (ASR) applications that is capable of distributing computations between clients and a server, depending on the client capabilities and security requirements.

It is another object of the present invention to provide a client-server platform for a variety of automatic speech recognition (ASR) applications that minimizes the network data traffic.

It is another object of the present invention to provide a client-server platform for a variety of automatic speech recognition (ASR) applications that has a scalable architecture, in which all the components are scalable.

Other objects and advantages of the invention will become apparent as the description proceeds.

SUMMARY OF THE INVENTION

The present invention is directed to a system with a client-server architecture for Automatic Speech Recognition (ASR) applications, that comprises:
  client-side including:
  a.1) a distributed front end for converting acoustic waves to feature vectors representing the properties of the acoustic waves using DSP;
  a.2) VAD for separating between speech and non-speech acoustic signals and for environmental compensation;
  a.3) adaptor for WebSockets to pipeline chunked feature vectors to the server side;
  b) a server side including:
  b.1) A web layer utilizing HTTP protocols and including a Web Server having a Servlet Container for interacting with Java servlets and for managing the lifecycle of servlets using WebSockets as a transducer that transfers WebSockets' packets to messages;
  b.2) a Message-Oriented Middleware, connected to the Web Server, for feature vector delivery and decoding and for load balancing between the client side and the server side;
  b.3) a recognition server and an adaptation server both connected to the Message-Oriented Middleware, the adaptation server being connected via an adaptation channel, the recognition server interacts with the client side via a recognition channel and a Distributed Frontend (DFE);
  b.3) an intermediate layer for transport, communication and integration;
  b.4) a Speech processing server consisting of a Recognition Server for instantiation of a recognition channel per client and for establishing a communication channel between the web layer and the recognition channel; and
  b.5) a Persistent layer for storing the acoustic models of each client in a hierarchical order, comprising a Language Knowledge Base connected to the recognition server and to the adaptation server, and includes a dictionary, acoustic models, statistical language models and language patterns.

The DFE dynamically may distribute the process of features extraction between the client and server sides, depending on demand and according to the computational power of the client side and the network bandwidth resources.

The DFE may comprise:
  a DSP module for preprocessing and conversion of audio data to feature vectors;
  VAD filters;
  web protocol input/output adaptors and message queue producer/consumer adaptor on the server side, for encapsulating complexities of dedicated transport marshaling and unmarshaling.

The client may be a microphone that is dedicated to a specific user.

The preprocessed acoustic signals may be sent to a WebSockets adaptor being an interface for performing a marshaling operation on the objects of the acoustic signals before being sent to the server side The web server may include a WebSockets connector being an interface for performing an unmarshaling operation.

The web server may also include:
  a) a first Message Queue Adaptor for sending the features vector via a Message queue to a second Message Queue Adaptor on the voice decoding channel, which includes a filter that checks changes in the features vector and generates additional features from the changes; and
  b) a searcher module which decodes the acoustic signals and operates in a shared and re-enterable search space for avoiding synchronization.

An HA Proxy may be used for load balancing.

Feature extraction may be made on the client side, while dynamic feature extraction may be made on the server side.

The Language Knowledge Base (LKB) may consist of:
- an Acoustic Model Database that is constructed hierarchically according to language, accent, gender and the speaker's ID;
- a Language Model Database that is constructed according to a statistic model of n-grams per domain and to language patterns;
- a dictionary which contains multiple phonetic transcription for all available for recognition vocabularies. It serves as a connection between the Language and Acoustic Model Databases.

The adaptation server may use the collected knowledge about the client to search and find the optimal acoustic model for that client and to change the model, if needed.

DETAILED DESCRIPTION OF PREFERRED EMBODIMENTS

The present invention proposes a novel client-server platform for a variety of automatic speech recognition (ASR) applications that are working in the Internet/Intranet, such as dictation, voice request, audio data indexing, voice to text alignment, key word spotting, etc.

The platform uses a Through Feature Streaming Architecture (TFSA) for allowing interaction between the ASR system components in an optimal manner. The capabilities of the proposed platform are:

Improved performance with a minimal time response of the ASR system;

Scalability: the ability of a system to increase throughput accommodation for a growing load;

Extendibility: the ability to extend the system to include new functionalities;

Adaptability: a flexible server side architecture that allows easy adaptation to different environments;

Low cost: using open source software allows reducing the costs of the proposed solution.

Accordingly, the computational load is adapted to maximize usage of a computational power of the client while reducing the load on server side and minimizing the required data traffic between the client side and the server side, in order to improve performance. Additional improvement is obtained by starting decoding on the server side as quickly as possible, that is achieved by streaming of chunked (packeted) feature vectors. Existing message oriented middleware with a universal interface is used to improve scalability, extendibility and adaptivity, as well as using HTTP-based protocols for networking. The present invention proposes an efficient algorithm of decoding provide maximum scalability and adaptability of the architecture.

Figure 1:
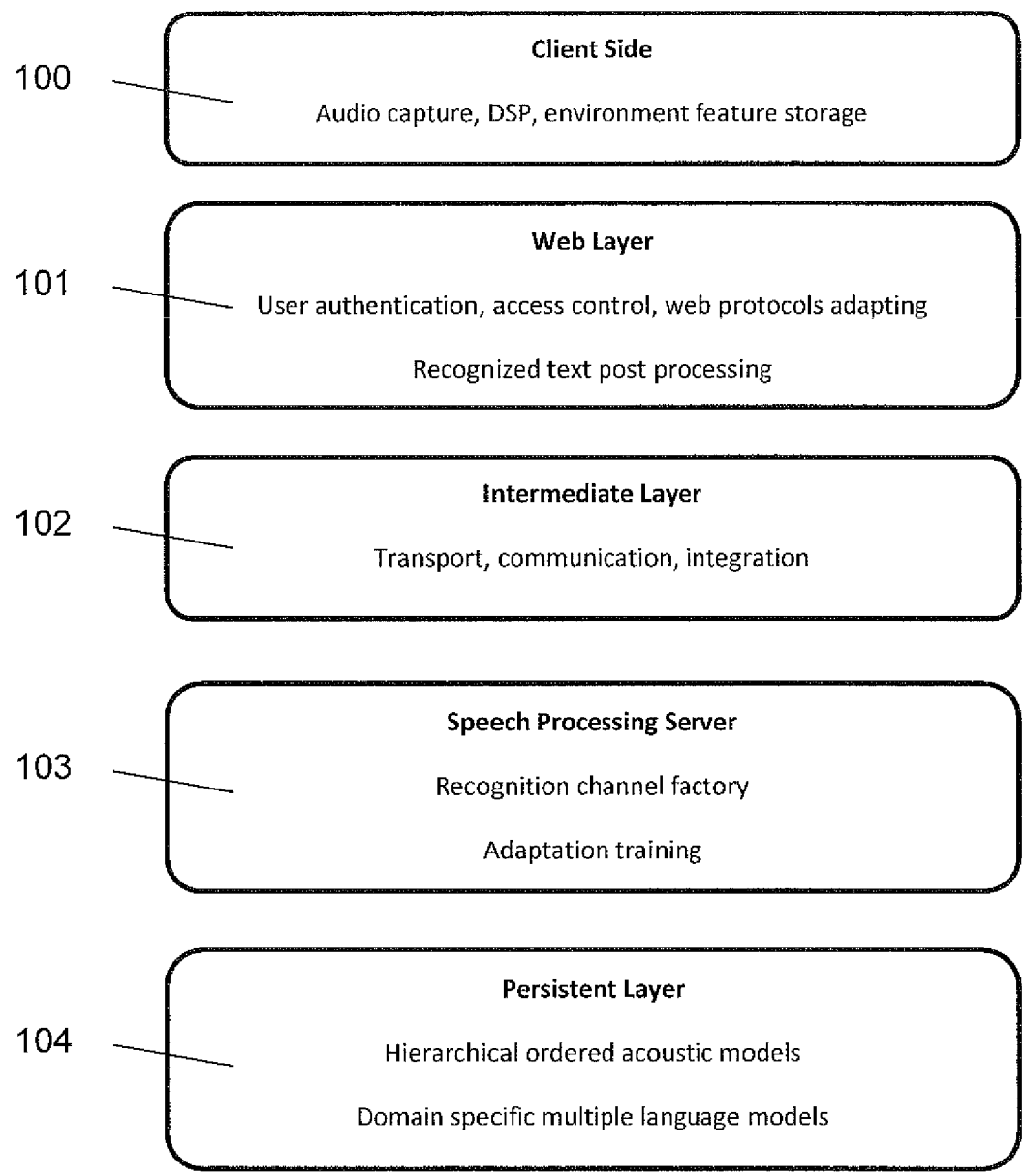
FIG. 1 illustrates the proposed client-server architecture for ASR web applications.

FIG. 1 illustrates the proposed client-server architecture for ASR web applications. The proposed Through Feature Streaming Architecture (TFSA) is multilayered and comprises 5 main layers and additional two layers (not shown) which are used for clustering. Each layer has a clearly defined functionality and responsibilities. Multilayered Architecture decouples additional services from the application layer (the voice processing service), simplifies changes of protocols and components and allows upgrading the TFSA by parts.

Service layers are transparent to the speech recognition process. This is achieved by introduction of a Distributed Frontend (DFE). It means that the process of features extraction may be distributed between the client and server sides in different ways, depending on, the computational power of the client, the network bandwidth, security requirements and etc. This allows optimal distribution of computational loads between the client and the server sides.

Figure 2:
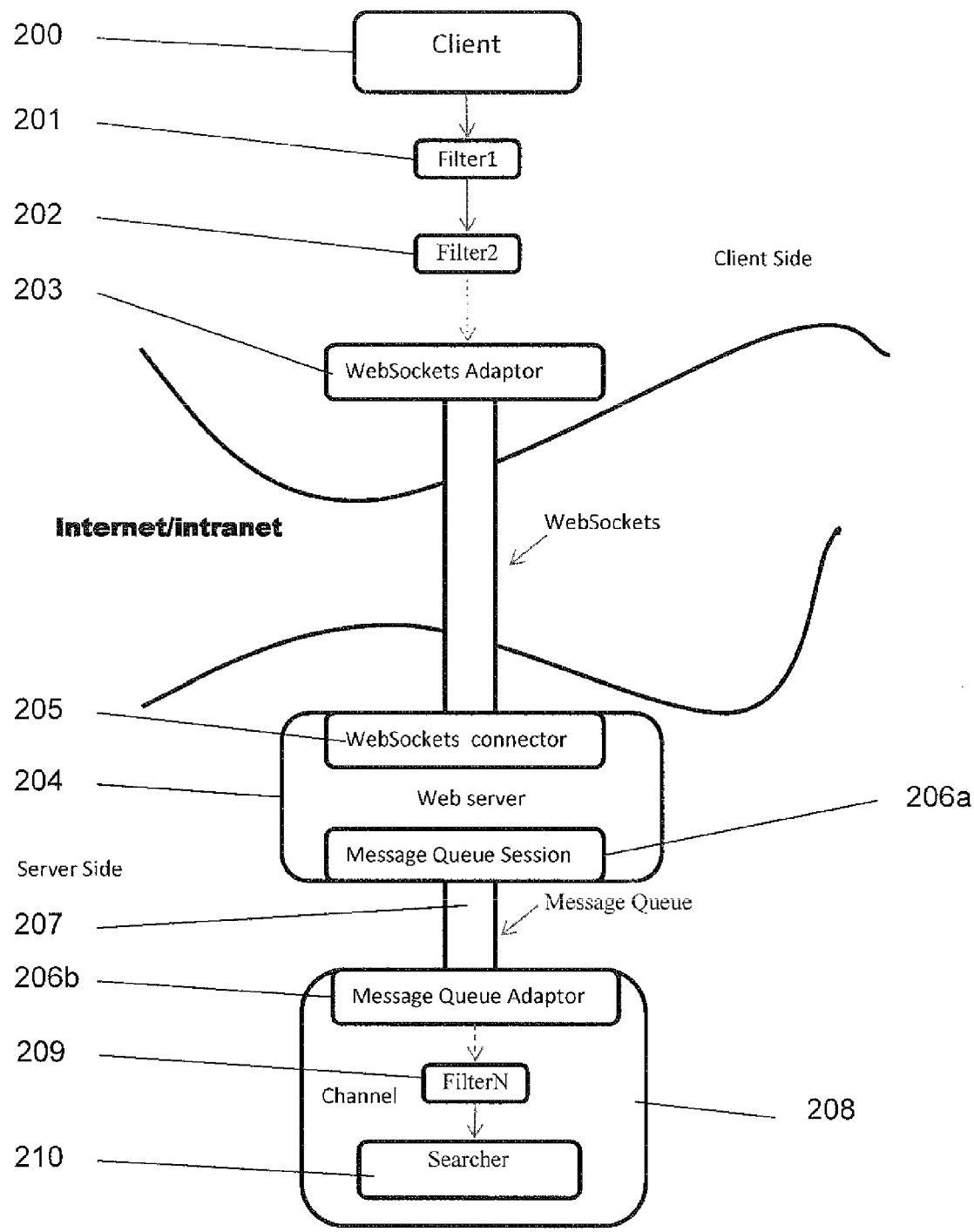
FIG. 2 illustrates the architecture of a Distributed Frontend for features extraction, according to the present invention.

The DFE is realized as a series of "chained filters". Besides DSP, VAD filters and noise reduction, the DFE has additional filters that are adaptors: web protocol input/output adaptors and message queue producer/consumer adaptor on the server side. These adaptors implement the same interface as other filters and encapsulate complexities of dedicated transport, marshaling (the process of converting the data or the objects into a byte-stream) and unmarshaling (the reverse process of converting the byte-stream back to their original data or object) of feature vectors. The client and the decoder continue to work similar to non-distributed applications, as illustrated in FIG. 2.

In the proposed TFSA, the client side includes a part of DFE that carries out the conversion of audio data (in different formats) to feature vectors using DSP. The client side 100 also includes VAD in order to separate between speech and non-speech acoustic signals, as well as noise compensation algorithms for environmental noise reduction and echo cancelation. The client side 100 generates feature vectors packets and pipelines them to the server side via a WebSockets (a technology that allows performing real-time communication between a client side and a server side, rather than polling for changes back and forth) adaptor (the adaptor translates between the WebSockets implementation and the actual application).

The proposed DFE uses packeting of feature vectors to minimize network traffic via WebSockets. DFE forms a bi-directional communication channel between a web server and a client that allows messages to be sent back and forth. The header of each chunk of WebSocket in this case has just 2 bytes. Therefore, using such a DFE minimizes network traffic.

The amount of transmitted data between the client and server sides is reduced by splitting the feature extraction activity of the FE into two parts. Static feature extraction is made on the client side, while dynamic feature extraction is made on the server side. As a result, the compression of data is increased by a factor of 6 (an essentially lossless compression), compared to the voice streaming in a Pulse-code modulation (PCM) format (16 bit sample×16 kHz sampling rate).

When environment compensation or speaker normalization algorithms are used, the client side is responsible to persist accumulating results to improve recognition performance. Firstly, the live cepstral (Mel-Frequency Cepstral Coefficients, or MFCCs) mean normalization is improved by storing an initial means vector on the client side between sessions. Secondly, if Vocal Tract Normalization (VTN—is a widely used speaker normalization technique which reduces the effect of different lengths of the human vocal tract and results in an improved recognition accuracy of automatic speech recognition systems) is used, the warping factor is saved on the client side after detection. Thirdly, the transformation matrix for reducing dimensions can be stored on the client side, when Linear Discriminate Analysis (LDA—a method of pattern recognition and machine learning to find a linear combination of features which separates two or more classes of objects) is used. A particular frontend library must be implemented for each client's platform.

The Web layer 101 utilizes HTTP protocols that are commonly used in many internet/intranet applications. In distributed applications, these layers are essential for creating a scalable solution. The main component of this layer is a Web Server. There are many different commercial and open source Web Servers. In Java based applications, such functions are performed by a Servlet Container, which is the component of a web server that interacts with Java servlets and which is responsible for managing the lifecycle of servlets (a Java programming language classes used to extend the capabilities of a server), mapping an URL to a particular servlet and ensuring that the URL requester has the correct access rights. For example, Jetty is a Java-based open source servlet container that has an embedded support of WebSockets and is used as a transducer that transfers WebSockets' packets to messages.

Also, using WebSockets resolves the problem of firewalls as WebSockets has an HTTP-compatible handshake process, according to which HTTP servers can share their default HTTP and HTTPS ports (80 and 443) with a WebSockets gateway or server.

The Web Layer is a convenient access point for corporate information systems, such as Lightweight Directory Access Protocol (LDAP—standard application protocol for accessing and maintaining distributed directory information services over an IP network) or Windows Registry or Database or more specific Radiology Information System (RIS—networked software suite for managing medical imagery and associated data). Using them, the TFSA can have access to additional information about the speaker and domain that maybe useful as for the adaptation acoustic model, as well as for decoding and post-processing (for example: gender dependent recognized text correction).

Another benefit is that a Web Server provides effective schemes for authentication and authorization of clients, load balancing and fault tolerance (the property that enables a system to continue operating properly in the event of the failure of some of its components) solutions.

The proposed TFSA also uses Message-Oriented Middleware (MOM—is software or hardware infrastructure supporting sending and receiving messages between distributed systems) for decoupling the process of feature vector delivery and decoding. Delivered data is buffered in an input queue. The MOM also provides load balancing and scalability for the server side. It gives a unified and a powerful solution for TFSA subsystems integration, cooperation and supplies reliable transport for organization peer-to-peer connections between the client and the decoding process on the server side. This layer implementation is based on Java Message Service (JMS—is a Java Message Oriented Middleware API, for sending messages between two or more clients). Apache ActiveMQ (open source message broker written in Java together with a full Java Message Service client) is an open source powerful and fast framework that implements JMS API and integration patterns, as well as providing Enterprise Features like the "clustering" technique of linking many computers together to act like a single computer.

Figure 4:
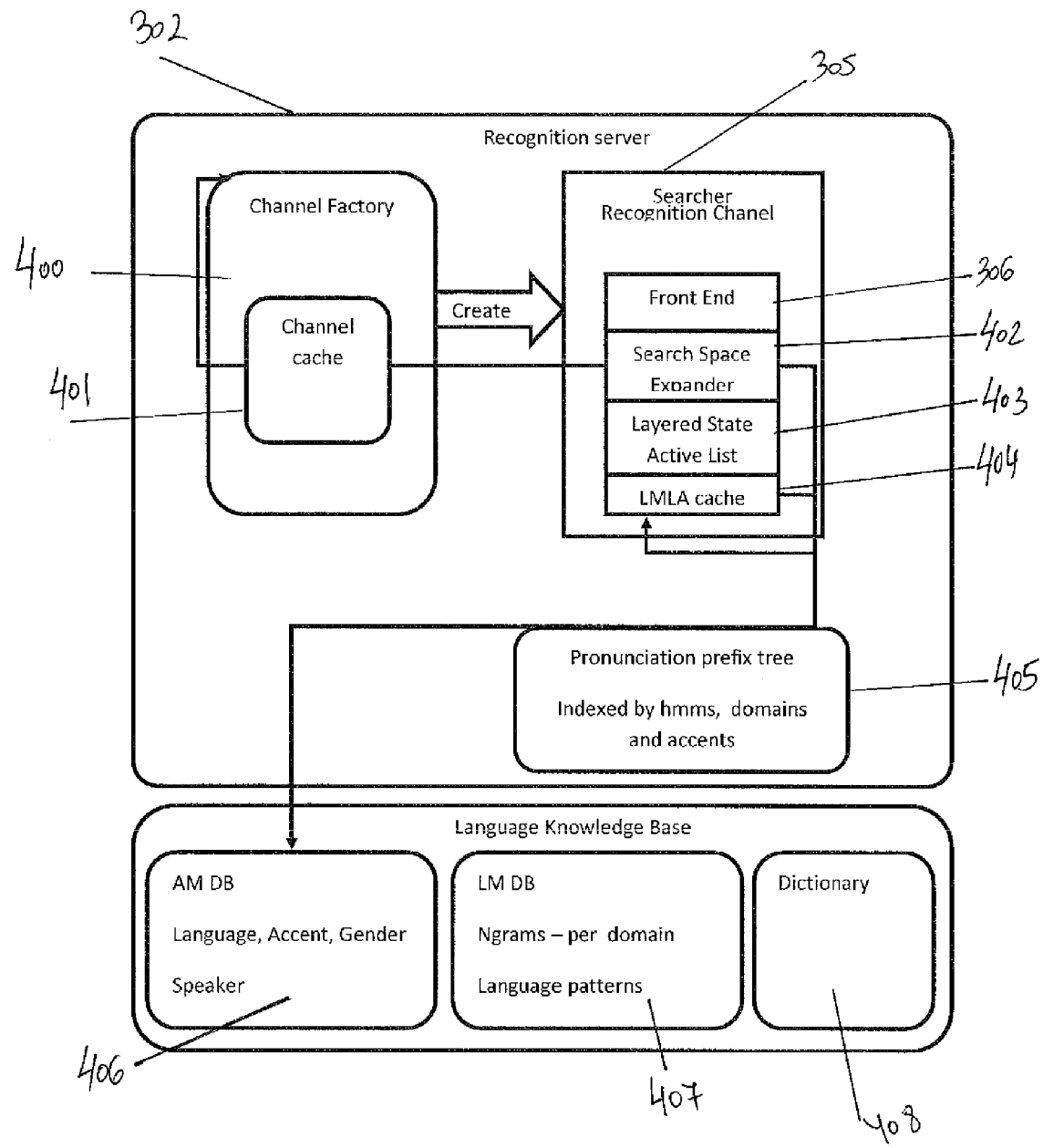
FIG. 4 illustrates the architecture of the recognition server.

The intermediate layer 102 serves as a shared bus that transmits instructions and data. Thus, in TFSA interoperation between subsystems on server side is message driven. This topology decouples subsystems and allows increasing of overall productivity and fault tolerance, as illustrated in FIG. 4. JMS TFSA may be easily extendible by other subsystems such as File Transfer Protocol (FTP), Mail Servers, SMS gateway, etc.

A Recognition Server (RS) 302 and an Adaptation Server (AS) 303 are two main component of the Speech processing server 103. According to the invention, language modeling process and speaker independent or clustered according to language, accent, gender or other property acoustic models training are performed offline and deployed in time of installation.

A Recognition Server (RC) 302—the abstraction assigned to encapsulate the process of instantiation of a recognition channel per speaker and organize communication channel between the web layer 101 and the searcher. Its instantiation includes fetching from persistent layer speaker independent acoustic model and language model and building global search space.

A Global Search Space

In ASR, the search space (the space of all feasible solutions) is represented as multilevel embedded graph that includes information from language model that connects possible transition from word to word, where each words is an embedded graph of different variants of its pronunciation and where each phoneme is embedded Hidden Markov Model (HMM—is a statistical Markov model in which the system being modeled is assumed to be a Markov process with unobserved (hidden) states). There are two main types of language models: fully connected models and dynamically expanded models. Practically, it is impossible to construct a fully connected model higher than bigram for large vocabulary recognition. Due to the absence of reuse in such an approach, it is needed to construct a different search space for each supported domain, although often overlapping between domains is significant.

The proposed TFSA utilizes a dynamic approach, where the search space has static and dynamic parts. The static part (named Global search space) is shared by all channels. For maximal efficiency, the search is stateless and re-enterable to avoid a synchronization problem. Its instantiation is based on building Pronunciation Prefix Tree (PPT) indexed by acoustic model and by all n-gram (a contiguous sequence of n items from a given sequence of text or speech) and grammar models that the language model includes. Post processing turns PPT into a closed graph that includes inter-words transitions. The dynamic part is built in the process of decoding and is different for each channel.

The Searcher

A Searcher or a decoder is the object that encapsulates logic of search algorithm and non-shared data. The proposed TFSA utilizes Time-Synchronous Viterbi Width Beam Search for Hidden Markov Models (HMMs) algorithm with dynamic search space expansion.

Generally, direct implementation of the Viterbi algorithm is quite difficult, especially for supporting multiple speaker parallel decoding. The Token Passing algorithm (a channel access method where a signal called a token is passed between nodes that authorizes the node to communicate—proposed by Young et al. (1989): "Token Passing: a Simple Conceptual Model for Connected Speech Recognition Systems") is used to overcome this difficulty, where tokens are propagated through search space and include information about different levels of history in constructions, such as Word Link Record (WLR—it is created with link to previous one each time when a search states corresponding leaf in PPT are expanded. Each token has WLR field.). So typically, in Large Vocabulary ASR (LVASR) decoding algorithm each frame (feature vector) iterates over tokens that survived in the active list and generates new tokens for all possible transition according to links to dynamic search state that in turn has link to lexical graph and HMM. So it is a double work to expand the search space and to produce tokens. Another problem with tokens is how to manage with multiple transitions from different states into one state to keep Viterbi Approximation (which estimates the total likelihood as the probability of a single most likely sequence) that takes only transition with maximum score. In case of Token Passing it is required to check whether transition exist in active list to compare score and replace, if needed. One of a possible solution for the problem is using hash tables. However, it is memory and time consuming solution.

There are solutions which is closely related to specific topology HMM topology and therefor have a loss of generalization.

State Passing (SP)

Therefore, the present invention proposes State Passing algorithm that solves above problem and suitable for arbitrarily complex networks affective for n-gram models.

By analogy to Token Passing, State Passing traverses over dynamically expanded search space, but the expansion is by search HMM graph entirely. This allows avoiding the Viterbi Approximation problem described above. Instead of producing tokens the search states is used and placed in a Layered Active List. Each state implements a SearchState interface that includes the following methods:

void expand (layered_active_list, counter);
void addToactivelist (layered_active_list, counter, WLR, transition score, search space expander);

For each frame the Searcher increments a frame counter, iterates over survived states in layered active list and for each one invokes an "expand" method with the counter and layered active list as parameters. Current state in turn invokes the expander to expand itself if was not yet expanded. After that the state iterates over its transition and invokes on target state method "addToactivelist" with parameters. The target state compares its corresponding field with the counter and detects whether the state already exist in a active lists and simply put itself to active list or update its score.

The process much more likely represent spanned search state's life time in an active list—waveform character of Viterbi algorithm. SP is well consistent with Object Oriented Design because it decuples the search algorithm from search space implementation. Each certain search state type knows its dedicated active list. Also, states that are not presented in the current active list but existed in the expanded search space will not be considered as garbage by the garbage collector.

Search Space Expander

The Search Space Expander is responsible for expansion a speaker specific search space by its acoustic model. The life circle of the object is identical to the life circle of the Recognition Channel.

Figure 6:
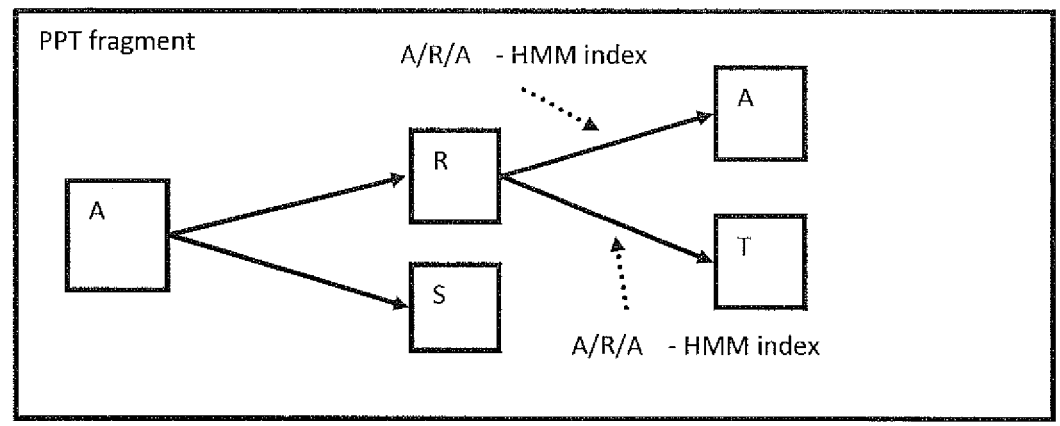
FIG. 6 illustrates a shared state model.
Figure 6:
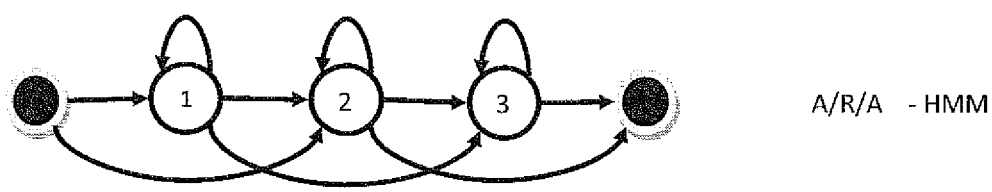
Figure 6:
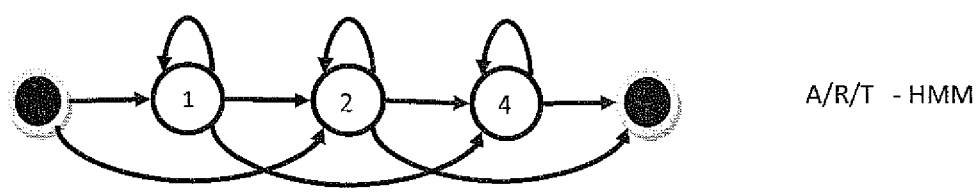
Figure 7:
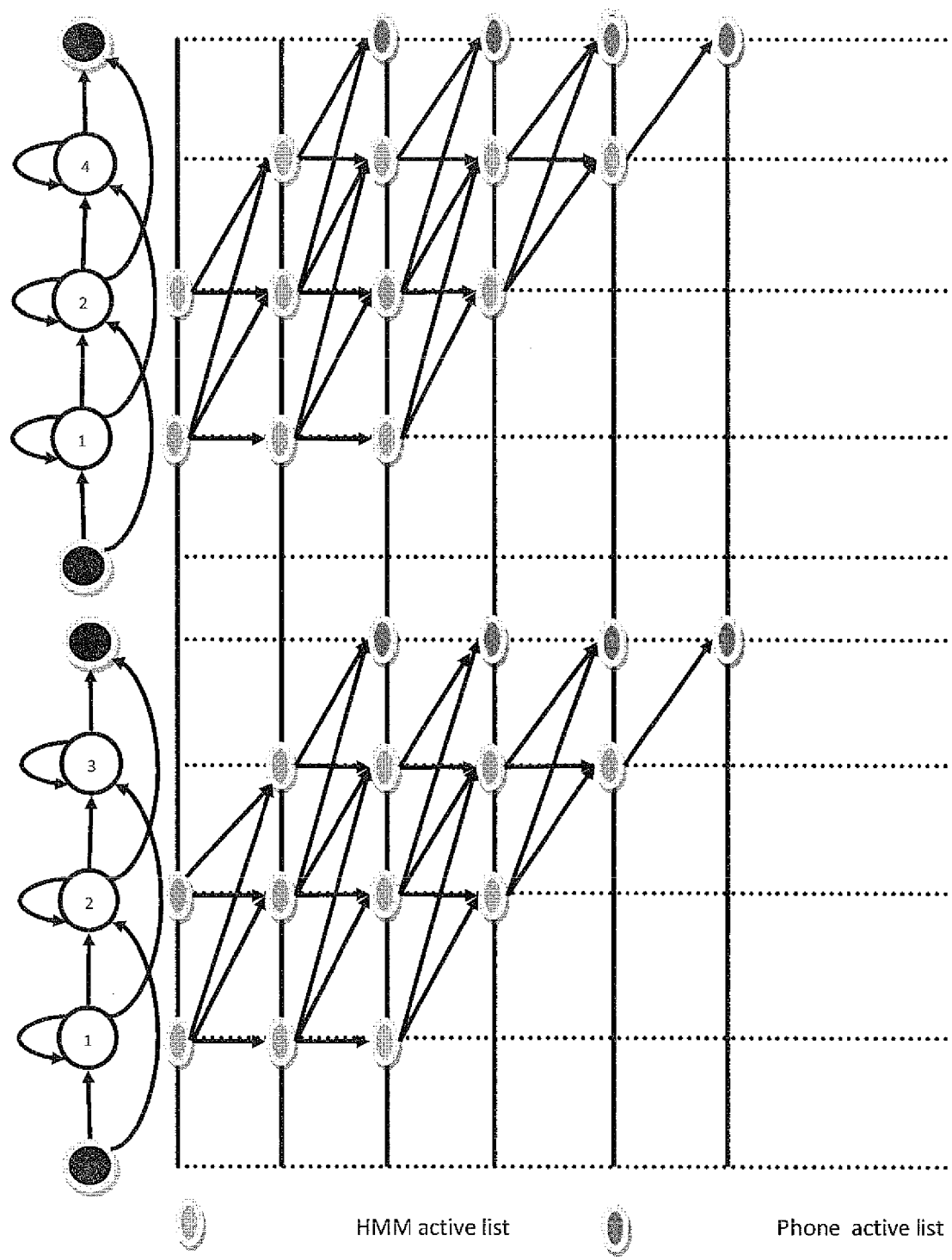
FIG. 7 illustrates a Trellis expansion for allophones.

Acoustic score calculation is one of the most time consuming parts of Viterbi algorithm. Shared States or senone (a basic sub-phonetic unit) acoustic models significantly reduce it. But, as shown in FIG. 6 and FIG. 7, that alaphones with shared states will often presented in different active hypothesis at the same time. To avoid multiple scoring caching senone wrappers instead of senones is used.

The Search Space Expander expand state by HMM search graph entirely. It means that only final HMM search states are required additional fields for expander and corresponding HMM.

In a case of Bakis (a Model Topology according to which as the time increases state index increases or stays the same, from left to right) HMM topology expander built HMM search graph very effective. Expander iterates over HMM states from right to left create corresponding HMM search state in array with same index and for the state for all outgoing transition target index create transition to search state that already exist.

For Ergodic models in which each state in the model can be reached in one step—i.e., fully connected graph, if its statistical properties can be deduced from a single, sufficiently long sample (realization) of the process) a similar two pass procedure is required.

Layered State Active List

The Layered State Active List consists of 3 level active lists, each of them has different absolute and relative beams:
  acoustic active list for HMM's emitting states;
  phonetic active list that corresponding final HMM's non-emitting states;
  grammatical active list for PPT's leaves responsible for inter word transition.

The Layered State Active List encapsulates algorithm of histogram pruning. In TFSA Median of Medians is implemented.

Language Model Look Ahead (LMLA)

In addition to the layered state active list and search space expander LMLA (a technique is to incorporate the language model probabilities as early as possible in the pruning process of the beam search strategy) is integral third part of the Searcher.

It is a common problem in ASR to incorporate LM score as soon as possible. But for PPT organized search space, we have to achieve a leaf to know a word identificator. Common solution is factored PPT. But it challenge to incorporate in real life LVASR system.

In TFSA LMLA is single point of LM score access as for internal nodes of PPT as for word node (leaves in the tree). To support LMLA, the n-gram models are lexicographically ordered and indexed together with the dictionary. The LMLA is represented by a vector of LM score and cached in Least Recently Used cache by word history. Instead of ordinary interface for LM models that has a method with signature like: float getProbability(word[ ] words_chain); TFSA LM API include batch method: fillAllProbabilities(word[ ] words_history) that partially fills above LMLA vector by probabilities for all given domain's vocabulary to follow for given words history. Remaining part of the vector is filled by polling of anchor nodes in PPT that was selected in the process of PPT building.

A constructed or fetched LMLA vector is placed into WLR and shared by all states on a path from one inter word transition to other one.

An adaptation server 303 can use the collected knowledge about the client to search and find the optimal acoustic model for that client and to change the model if needed. For example, it considers the known languages and the accent of each client and adaptation is made accordingly. Speaker Adaptive Training (SAT a method for joint speaker normalization and estimation of the parameters of the speaker independent acoustic models) is classified as supervised and unsupervised. In a supervised mode, the client side guides the user to read text prepared by the system opposite to usage decoded results. First method involves process enrolment that itself is a complicated task but in a case of cooperative user. Adaptation server applies several training algorithms.

The Persistent layer 104 stores the acoustic models of each client in a hierarchical order, such as the models of the used language, accent model and gender model. It also comprised subdomains of models that are related to each specific language. For example, in the field of medical imaging, such subdomains may include X-Rays related speech or Magnetic Resonance Imaging (MRI) related speech, where each subdomain has its own terminology.

Persistent layer (PL) is a last layer in the TFSA. Its main purpose is to store Language Knowledge Base (LKB) that includes knowledge about relation between words from a language (language model) and phonetics that show how pronounce it (acoustic model).

As in enterprise level, application PL can be presented in different forms: relation database, web service, file system and so on. By the same way in TFSA, the persistent layer is decoupled from VPS by Data Access Object pattern (DAO pattern—is used to separate low level data accessing API or operations from high level business services) that encapsulates different aspects of access to a particular store and it also increases the adaptability of the TFSA.

Although it possible to store LKB in Relational DataBase (RDB—a database that stores information about both the data and how it is related), it is too hard to map AM and LM to relational model in RDB or you need to serialize them into binary large object BLOBs (immutable objects that represent raw data) that is not best supporting type by RDBs. In any case, fetching and construction of corresponding objects will be too slow operation for our purpose.

Depending on payloads, Berkeley DB Java Edition (BDB JE) or java distributed cache can be used.

Oracle Berkeley DB Java Edition (BDB) is an open source, embeddable, transactional storage engine written entirely in Java. Its remarkable performance and small memory footprint make it an optimal solution for vertical scalability and embedded configuration.

Clustering

TFSA is intended to be running in clouds but also can be accomplished as a standalone full featured cluster.

TFSA recognition server has remarkable scalability features as for vertical as for horizontal scalability. JMS enables a distributed communication that is loosely coupled, reliable and scalable. Such solution as a JMS broker network and shared queues allows creating of very large clusters. Servlet container clustering is also a well-known process. BDA JE high availabilities also are well documented.

For maximum load balancing, an HA Proxy (an open source, fast and reliable solution offering high availability, load balancing, and proxying for TCP and HTTP-based applications) is used. For high availability, Heartbeat is used coupled with "single point of failure" solution such as Pacemaker.

FIG. 2 illustrates the architecture of a Distributed Frontend (DFE) for features extraction, according to the present invention. According to the proposed DFE architecture, the process of features extraction is distributed between the client and server sides in different ways, depending on demand. This allows continuous optimal distribution of computational loads between the client and the server sides, according to the computational power of the client side and the network bandwidth resources.

Due to different nature of between layers communication protocol besides DSP, VAD filters and noise reduction DFE has additional filters that are adaptors: web protocol input/output adaptors, message queue producer/consumer adaptor on the server side. These adaptors implement the same interface as other filters and encapsulate complexities of dedicated transport marshaling (the process of converting the data or the objects into a byte-stream) and unmarshaling (the reverse process of converting the byte-stream back to their original data or object) feature vectors. The decoder continues to work similar to non-distributed applications The client 200 is generally a microphone that is dedicated to a specific user (speaker). The acoustic signals are forwarded from the client's microphone to a chain of filters 201, 202 (and more, as needed) for preprocessing. For example, Filter1 (201) may implement a pre-emphasizing function on the acoustic signal, followed by a windowing function implemented by Filter2 (202), followed by FFT, VAD and etc. Extracted feature vectors are sent to a WebSockets adaptor 203 (optional), which is an interface for performing a marshaling operation on the objects of the processed acoustic signals before being sent to the server side (web server 204) as a byte-stream over the internet/intranet. The web server 204 includes a WebSockets connector 205 (optional), which is an interface for performing an unmarshaling operation on the received byte-stream in order to transfer it to decoder. A Message Queue Session 206a on the web server 204 is used to send the features vector via a Message queue 207 to another Message Queue Adaptor 206b on the voice decoding channel 208, which includes a FilterN 209 that extracts dynamic features in addition to static ones and the searcher 210 which decodes the feature vectors stream.

Figure 3:
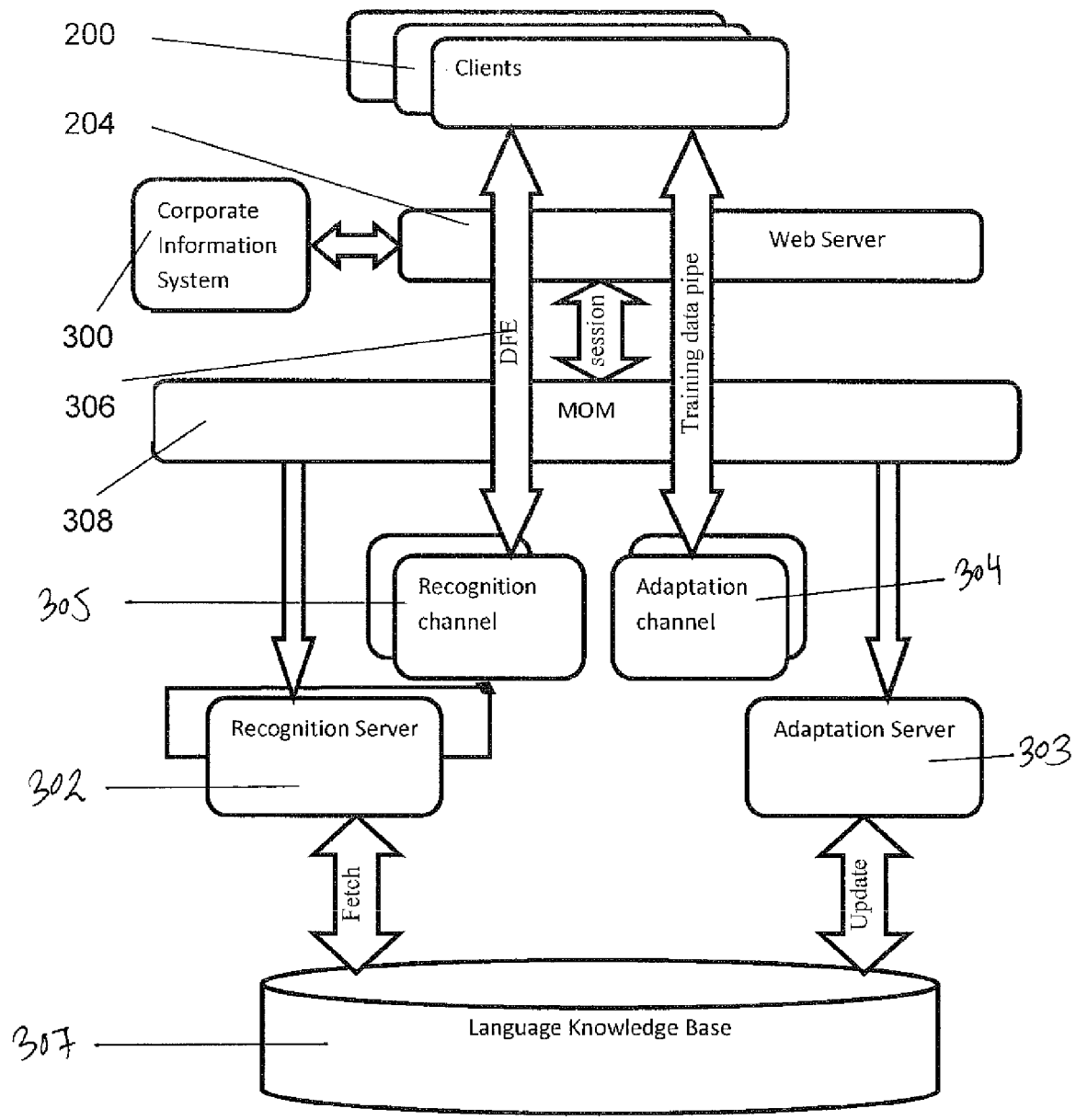
FIG. 3 is a schematic diagram that illustrates the connections between the layers described in the TFSA of FIG. 1.

FIG. 3 is a schematic diagram that illustrates the connections between the layers described in the TFSA of FIG. 1. The client(s) 200 interact with the web server 204 to initialize HTTP sessions. To provide it web server 204 optionally interacts with a corporate information system 300.

If the first user session clients turn in supervised adaptation mode and interact via web server 204 and Message-Oriented Middleware 301 with adaptation server 303. Adaptation server 303 fetches from Language Knowledge Base (LKB) 307 acoustic model which is closest for the speaker, based on information from corporate information system 300 or direct from the user interface and open adaptation channel 304 and training data is pipelined from client for adaptation. The adapted acoustic model is stored in The Language Knowledge Base (LKB) 307.

After the speaker adapted model was created, the model is just available for decoding purpose. Supervised adaptation does not require any synchronization between recognition server 302 and adaptation server 303.

In decoding mode the client(s) 200 interact via web server 204 and Message-Oriented Middleware 301 with recognition server 302 to fetch or create a recognition channel 305 and the Distributed Frontend (DFE) 306. The recognition server 302 the adaptation server 303 interact with the Language Knowledge Base (LKB) 307, which is used as a common Knowledge Base for both of them. The Language Knowledge Base (LKB) 307 includes a dictionary, acoustic models, global and comparative dictionary, statistical language models, as well as grammars and language patterns such as dates, measures and etc.

FIG. 4 illustrates the architecture of the recognition server 302 as central part of the architecture. The channel factory 400 receives a speaker's ID and checks in a channel's cache 401 whether or not channel is available. The channel factory 400 returns from cash or create a new one. In order to provide a new channel, channel factory 400 requests to The Language Knowledge Base (LKB) 307 for the speaker's adapted acoustic model. The recognition channel 305 includes the front end 306 and the searcher 210, which consists of a search space expander 402, layered state active list 403 and an LMLA cache 404. The search space expander 402 interacts with the Pronunciation prefix tree 405, which is indexed by hidden Markov model (HMMs), domains and accents and with speaker's adapted acoustic model that is pre-fetched from Acoustic Model Database 406. The Pronunciation Prefix Tree 405 is constructed from Language Knowledge Base (LKB) 307 and contains information about all possible transition on grammatical and phone levels for all supported domains and accents and indexed with speaker independent acoustic model.

The Language Knowledge Base (LKB) 307 consists of:
- an Acoustic Model Database 406 that is constructed hierarchically according to language, accent, gender and the speaker's ID.
- a Language Model Database 407 that is constructed according to a statistic model of n-grams per domain (for the sentence layout), as well as language patterns.
- a dictionary 408 which contains multiple phonetic transcription for all available for recognition vocabularies. It serves as a connection between the Language and Acoustic Model Databases.

Figure 5:
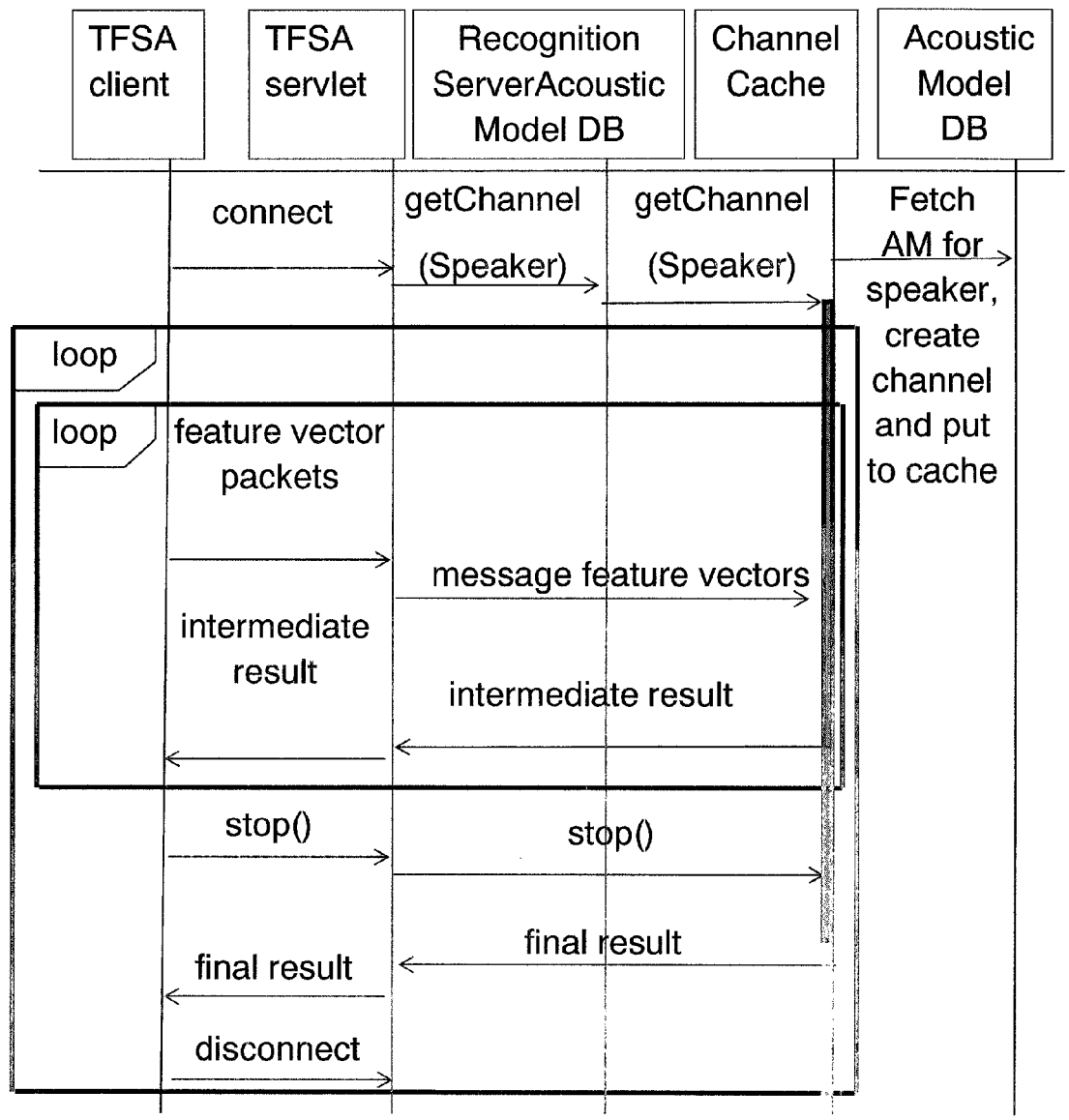
FIG. 5 illustrates the sequence diagram of a decoding session.

FIG. 5 illustrates the sequence diagram of a decoding session. The TFSA client connects to the TFSA servlet and initiates a getChannel call to the recognition server 302, in order to get a separate recognition channel 305 for the user. If the user is a new user, the recognition server 302 creates a separate recognition channel 305 for the new user and put it to channel cache. A packet of feature vectors is sent to the TFSA servlet, which returns an immediate result in the form of a real-time transcript of the speech to the user, as he speaks. The process continues as long as the user continues speaking, until the TFSA client sends a stop command to the TFSA servlet, which returns a final result in the form of a final transcript of the speech to a textual file.

As long as the speaker continues to speak, the channel is kept active until getting a disconnect command from the user.

The proposed TSFA employs Distributed Frontend, WebSockets protocol and Message-Oriented Middleware as transport layer for packets of feature vectors streaming (chunking) and achieves almost real time response as well as a remarkable capacity. TFSA provides a powerful solution for organization of a variety of ASR systems designed for different purposes.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A system having a client-server architecture for Automatic Speech Recognition (ASR) applications, comprising:
   a) client-side including:
      a.1) a client being part of distributed front end for converting acoustic waves to feature vectors representing the properties of said acoustic waves using Digital Signal Processing (DSP);
      a.2) Voice Activity Detection for separating between speech and non-speech acoustic signals and for environmental compensation;
      a.3) adaptor for WebSockets to pipeline chunked feature vectors to the server side;
   b) a server side including:
      b.1) A web layer utilizing HTTP protocols and including a Web Server having a Servlet Container which contains dedicated servlet for managing voice recognition sessions that include transferring WebSockets' packets to messages and returning responses and diagnostic message to client, said layer being an access point for corporate information systems, and a point of integration with another web application, which are used for load balancing and. authentication and authorization of clients;
      b.2) an intermediate layer for transport based on Message-Oriented Middleware (MOM) being a message broker, to which all other server parts are connected, for feature vector streaming, for communication and integration, and for load balancing between said client side and said server side;
      b.3) a recognition server and an adaptation server both connected to said intermediate layer, said adaptation server being connected via an adaptation channel, said recognition server interacts with said client side via a recognition channel and a Distributed Frontend (DFE);
      b.4) a Speech processing server consisting of a server part of distributed front end, a Recognition Server and an Adaptation Server;
      b.5) a Recognition Server for instantiation of a recognition channel per client;
      b.6) an Adaptation Server for adaptation acoustic and linguistic models for each speaker;
      b.7) a Bidirectional communication channel between Speech processing server and client side via distributed frontend said recognition channel; and
      b.8) a Persistent layer for storing, a Language Knowledge Base connected to said Speech processing server, and includes a dictionary, acoustic models, statistical language models and language patterns.

2. A system according to claim 1, in which the DFE dynamically distributes the process of features extraction between the client and server sides, depending on demand and according to the computational power of the client side and the network bandwidth resources.

3. A system according to claim 1, in which the DFE comprises:
   a) a DSP module for preprocessing and conversion of audio data to feature vectors;
   b) VAD filters;
   c) web protocol input/output adaptors and message queue producer/consumer adaptor on the server side, for encapsulating complexities of dedicated transport marshaling and unmarshaling.

4. A system according to claim 1, in which the client is generally a microphone that is dedicated to a specific user.

5. A system according to claim 3, in which the preprocessed acoustic signals are sent to a WebSockets adaptor being an interface for performing a marshaling operation on the objects of the acoustic signals before being sent to the server side.

6. A system according to claim 1, in which the web server includes a WebSockets connector being an interface for performing an unmarshaling operation.

7. A system according to claim 1, in which the web server includes:
   a) a first Message Queue Adaptor for sending the features vector via a Message queue to a second Message Queue Adaptor on the voice decoding channel, which includes a filter that checks changes in the features vector and generates additional features from said changes; and
   b) a searcher module which decodes the acoustic signals and operates in a shared and re-enterable search space for avoiding synchronization.

8. A system according to claim 1, in which, an HA Proxy is used for load balancing.

9. A system according to claim 1, in which static feature extraction is made on the client side, while dynamic feature extraction is made on the server side.

10. A system according to claim 1, in which the Language Knowledge Base (LKB) consists of:
- an Acoustic Model Database that is constructed hierarchically according to language, accent, gender and the speaker's ID;
- a Language Model Database that is constructed according to a statistic model of n-grams per domain and to language patterns;
- a dictionary which contains multiple phonetic transcription for all available for recognition vocabularies. It serves as a connection between the Language and Acoustic Model Databases.

11. A system according to claim 1, in which the adaptation server uses the collected knowledge about the client to search and find the optimal acoustic and language models for that client and to change the models, if needed.

\* \* \* \* \*

UNITED STATES PATENT AND TRADEMARK OFFICE
CERTIFICATE OF CORRECTION

PATENT NO. : 9,275,639 B2  
APPLICATION NO. : 14/390304  
DATED : March 1, 2016  
INVENTOR(S) : Victor Shagalov Page 1 of 1

It is certified that error appears in the above-identified patent and that said Letters Patent is hereby corrected as shown below:

The Assignee:

The Assignee information on the Title Page of the patent (73) "Assignee: Dixilang Ltd., Maishar (IL)" should read --(73) "Assignee: Dixilang Ltd., Meishar (IL)"--

Signed and Sealed this  
Seventeenth Day of May, 2016

Michelle K. Lee  
*Director of the United States Patent and Trademark Office*